United States Patent
Que (10) Patent No.: US 11,948,525 B2
(45) Date of Patent: Apr. 2, 2024

(54) REFRESH RATE ADJUSTING METHOD, ELECTRONIC DEVICE AND STORAGE MEDIUM

(71) Applicant: Beijing Xiaomi Mobile Software Co., Ltd., Beijing (CN)

(72) Inventor: Jing Que, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 49 days.

(21) Appl. No.: 17/732,980

(22) Filed: Apr. 29, 2022

(65) Prior Publication Data
US 2023/0197026 A1    Jun. 22, 2023

(30) Foreign Application Priority Data
Dec. 21, 2021 (CN) .......................... 202111574763.3

(51) Int. Cl.
*G09G 3/36* (2006.01)

(52) U.S. Cl.
CPC ....... *G09G 3/36* (2013.01); *G09G 2320/0613* (2013.01); *G09G 2330/021* (2013.01); *G09G 2340/0435* (2013.01)

(58) Field of Classification Search
CPC .... G09G 3/36; G09G 5/34; G09G 2320/0613; G09G 2354/00; G09G 2330/021; G06F 1/3206; G06F 1/3265; G06F 3/0485; G06F 3/04883; Y02D 10/00
See application file for complete search history.

(56) References Cited

U.S. PATENT DOCUMENTS

| | | | |
|---|---|---|---|
| 2018/0004340 A1* | 1/2018 | Yeh .......................... | G09G 3/20 |
| 2019/0034026 A1 | 1/2019 | Yeh et al. | |
| 2019/0180705 A1* | 6/2019 | Choudha ............... | G06F 3/0485 |
| 2019/0182452 A1* | 6/2019 | Choudha ............... | G06F 3/0485 |

FOREIGN PATENT DOCUMENTS

| | | |
|---|---|---|
| CN | 105892831 A | 8/2016 |
| CN | 113391684 A | 9/2021 |

OTHER PUBLICATIONS https://baijiahao.baidu.com/s?id=1711881460283093487&wfr-spider&for=pc.

* cited by examiner

*Primary Examiner* — Shaheda A Abdin
(74) *Attorney, Agent, or Firm* — Volpe Koenig (57) ABSTRACT

A refresh rate adjusting method, includes: obtaining a sliding speed of a page element in a display page of an electronic device; determining a candidate refresh rate corresponding to the page element according to the sliding speed of the page element, the sliding speed being directly proportional to the candidate refresh rate; and adjusting a current refresh rate of the electronic device according to the candidate refresh rate.

17 Claims, 5 Drawing Sheets

REFRESH RATE ADJUSTING METHOD, ELECTRONIC DEVICE AND STORAGE MEDIUM

CROSS REFERENCE TO RELATED APPLICATIONS

The present application claims the benefit of priority to Chinese patent application No. 202111574763.3, filed on Dec. 21, 2021, the contents of which are incorporated herein by reference in their entireties for all purposes.

BACKGROUND

A refresh rate is a parameter with Hz as a unit, and the numerical value of the refresh rate affects the quality of an image displayed by an electronic device. Taking the refresh rate of 60 Hz as an example, the refresh rate shows that a screen of an electronic device displays 60 new images within 1 second, and the greater the refresh rate is, the greater the number of images displayed per second is, so that the image displayed on the screen of the electronic device is smoother. However, the electronic device continuously maintains a high refresh rate, and the power consumption of the electronic device is increased to a certain extent, so that the refresh rate of the screen needs to be adjusted in an operation process of the electronic device in order to reduce the power consumption of the electronic device.

SUMMARY

The disclosure relates to the technical field of electronic information, in particular to a refresh rate adjusting method, an electronic device and a storage medium.

According to a first aspect of an embodiment of the disclosure, a refresh rate adjusting method is provided, including:
obtaining a sliding speed of a page element in a display page of an electronic device;
determining a candidate refresh rate corresponding to the page element according to the sliding speed of the page element, the sliding speed being directly proportional to the candidate refresh rate; and
adjusting a current refresh rate of the electronic device according to the candidate refresh rate.

According to a second aspect of an embodiment of the disclosure, an electronic device is provided, including:
a memory, storing a computer program; and
a processor is configured to execute the computer program in the memory to:
obtain a sliding speed of a page element in a display page of an electronic device;
determine a candidate refresh rate corresponding to the page element according to the sliding speed of the page element, the sliding speed being directly proportional to the candidate refresh rate; and
adjust a current refresh rate of the electronic device according to the candidate refresh rate.

According to a third aspect of an embodiment of the disclosure, a non-transition computer readable storage medium is provided, storing computer program instructions, wherein when the program instructions are executed by a processor to:
obtain a sliding speed of a page element in a display page of an electronic device;
determine a candidate refresh rate corresponding to the page element according to the sliding speed of the page element, the sliding speed being directly proportional to the candidate refresh rate; and
adjust a current refresh rate of the electronic device according to the candidate refresh rate.

It should be understood that the general description and the detailed description of the following text are only exemplary and interpretive, and cannot limit the disclosure.

BRIEF DESCRIPTION OF THE DRAWINGS

The accompanying drawings here are incorporated into and constitute part of the description, illustrate embodiments conforming to the disclosure, and are used together with the description to interpret the principles of the disclosure.

DETAILED DESCRIPTION

Examples will be described in detail, and the instances of the examples are represented in the accompanying drawings. When the following description involves the accompanying drawings, the same numerals in the different accompanying drawings represent the same or similar elements, unless otherwise indicated. The embodiments described in the following examples do not represent all embodiments consistent with the disclosure. On the contrary, the embodiments are just examples of apparatuses and methods consistent with some aspects of the disclosure as detailed in the attached claims.

At present, an adopted solution is that the refresh rate of the screen is reduced when it is detected that a finger does not touch the screen within a specified duration. However, according to the solution, longer timeout waiting is present, that is, the possibility of operating at a high refresh rate still exists within the specified duration, so that the effect of reducing the power consumption by the solution is possible.

In addition, in the related art, before the specified duration is reached, a refresh rate of a screen of an electronic device is kept unchanged, that is, a higher refresh rate is continuously maintained. The effect of reducing power consumption is greatly reduced. Based on this, embodiments of the disclosure provide a refresh rate adjusting method, an electronic device and a storage medium in order to solve the problems existing in the related art.

Figure 1:
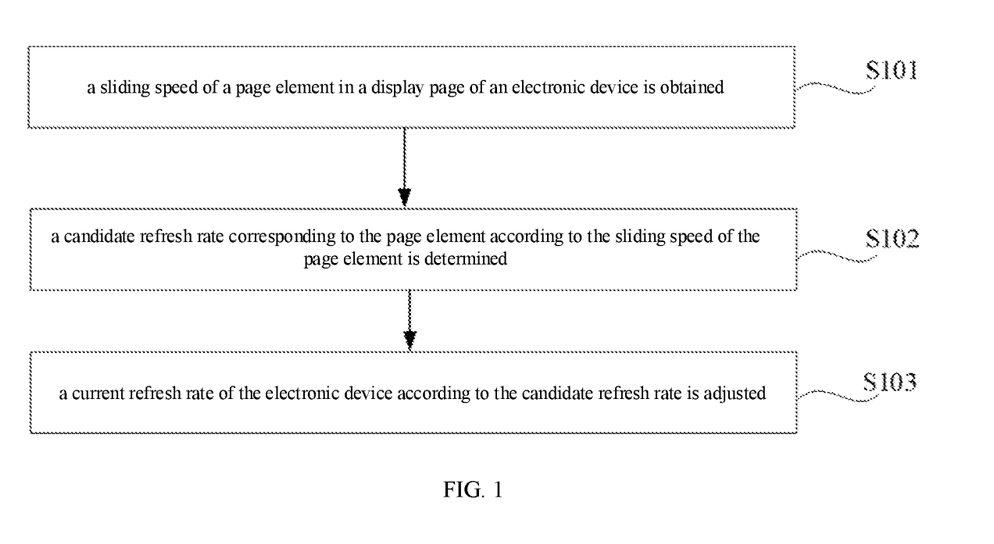
FIG. 1 shows a flow chart of a refresh rate adjusting method according to an example.

FIG. 1 shows a flow chart of a refresh rate adjusting method according to an example, and as shown in FIG. 1, the refresh rate adjusting method is applied to an electronic device and includes the following steps.

In Step S101, a sliding speed of a page element in a display page of an electronic device is obtained.

In some embodiments, the page element can be an element without any response function, for example, an icon, a text or the like merely for display. The page element may also be an element with a response function, for example, a control. The embodiment of the disclosure is further explained and illustrated by taking a page element being a control as an example.

In some embodiments, the control may be a page element in a dominant state that is characterized as a state visible to a user; and in some embodiments, the control may also be a page element in a hidden state that is characterized as a state invisible to the user.

In some embodiments, the control may be a page element in an application.

It is worth being noted that the control refers to packaging of data and methods. The control may have own attributes and methods. The attributes are simple visitors of the data of the control, and the methods are some simple and visible functions of the control. A creation process of the control includes design, development and debugging work, then, the control is used, and may make a corresponding response when touched, and corresponding functions are achieved. For example, a forwarding control may enable a response to an information forwarding function.

Figure 2:
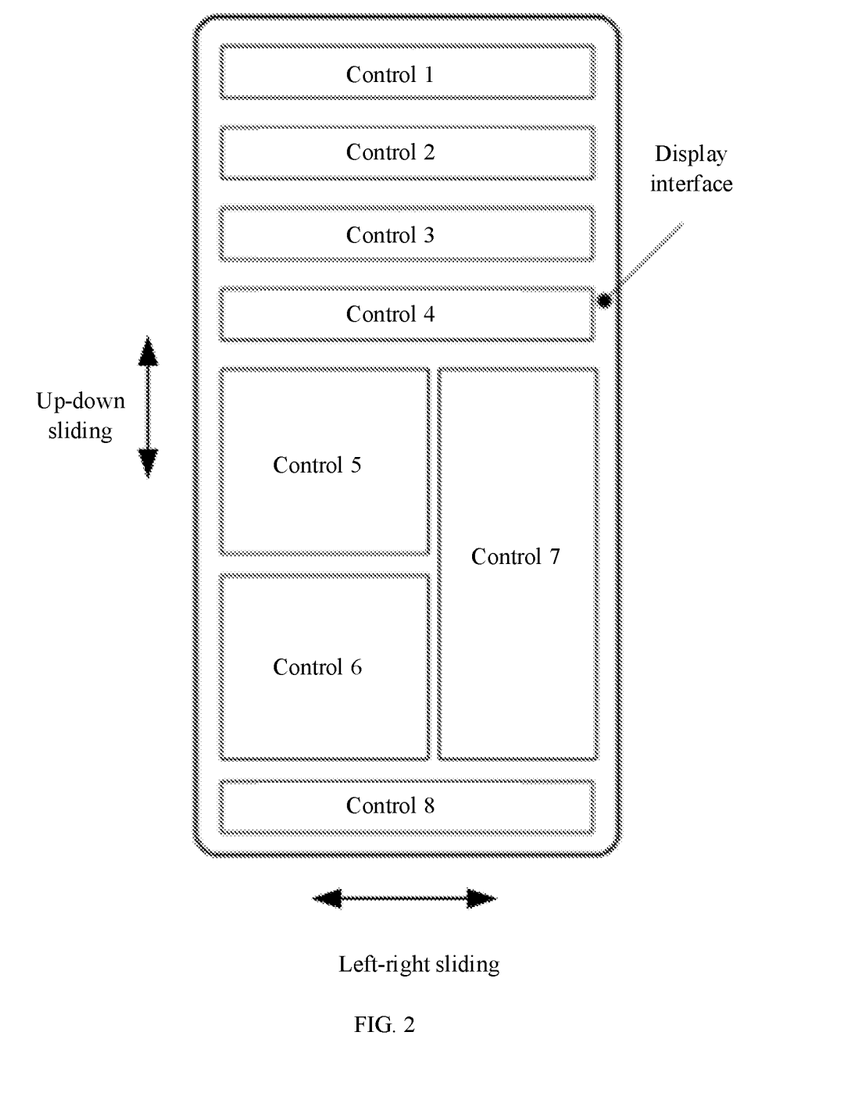
FIG. 2 shows a schematic diagram of a display page of an electronic device according to an example.

Referring to FIG. 2, eight controls (a control 1, a control 2, a control 3, a control 4, a control 5, a control 6, a control 7 and a control 8) are present in a display page of an electronic device. A user performs up-down sliding or left-right sliding on the display page, correspondingly, the control moves up and down or moves left and right on the display page to cause position change of the control, and further, the sliding speed of the control can be calculated according to the position change.

In some embodiments, obtaining the sliding speed of the page element in the display page of the electronic device may adopt the following mode: determining position change information of the page element in the display page of the electronic device within a first preset duration; and determining the sliding speed of the page element in the display page of the electronic device according to the position change information of the page element and the first preset duration. For example, the first preset duration is two seconds, within the two seconds, a certain vertex of the control serves as a reference point. The vertex moves to a second coordinate from a first coordinate on the display page. A value of a moving pixel point of the control can be obtained according to the first coordinate and the second coordinate, and the value of the moving pixel point reflects the position change information of the control. A ratio of the value of the moving pixel point to the first preset duration serves as the sliding speed of the control. Under the condition that the ratio of the value of the moving pixel point to the first preset duration is characterized as the sliding speed, the unit p/s of the sliding speed represents the number of moving pixel points per second.

Step S102, a candidate refresh rate corresponding to the page element according to the sliding speed of the page element is determined.

Figure 3:
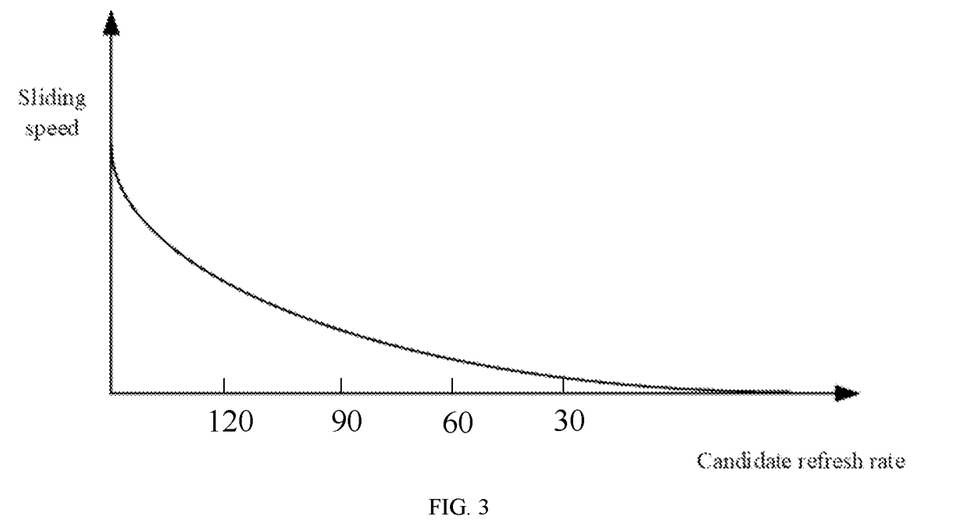
FIG. 3 shows a schematic diagram of a relationship between a candidate refresh rate and a sliding speed according to an example.

It is worth being noted that different sliding speeds correspond to different candidate refresh rates, and the sliding speeds are directly proportional to the candidate refresh rates. FIG. 3 shows a schematic diagram of a relationship between a candidate refresh rate and a sliding speed according to an example, with reference to FIG. 3, the higher the sliding speed is, the higher the candidate refresh rate is, and the smoother the switching of the display page is. On the contrary, the lower the sliding speed is, the lower the candidate refresh rate is, so that jamming may be caused to the display page.

In some embodiments, determining the candidate refresh rate corresponding to the page element according to the sliding speed of the page element may adopt the following mode: determining the candidate refresh rate corresponding to the page element according to a preset refresh rate configuration file and the sliding speed of the page element.

The refresh rate configuration file may be a file describing a relationship between the sliding speed and the refresh rate. In some embodiments, in order to avoid an increase in power consumption of the electronic device due to frequent switching of the refresh rate of the electronic device, the refresh rate configuration file may include a plurality of speed ranges and a refresh rate corresponding to each speed range. According to the speed range matched with and corresponding to the sliding speed of the control in the refresh rate configuration file, the candidate refresh rate of the control may be determined by the refresh rate corresponding to the speed range. The corresponding relationship between the candidate rate and the speed range is set, and the current refresh rate of the electronic device can be adjusted when the obtained sliding speed exceeds a critical value. For example, the corresponding relationship between the plurality of speed ranges and the refresh rate corresponding to each speed range included in the refresh rate configuration file is as shown in Table 1.

TABLE 1

| Speed range | V1-V2 | V2-V3 | V3-V4 | V4-V5 |
|---|---|---|---|---|
| Refresh rate | 120 Hz | 90 Hz | 60 Hz | 30 Hz |

It needs to be noted that in Table 1, $V1>V2>V3>V4>V5$, an overlapping value of the two speed ranges (such as an overlapping value V2 of V1-V2 and V2-V3 in the table) corresponds to the refresh rate corresponding to any one of the two speed ranges, which is not limited by the embodiment here. For example, when the sliding speed of the control is between V2 and V3, it can be determined that the candidate refresh rate corresponding to the control is 90 Hz.

In some embodiments, when the refresh rate configuration file is configured, because different models support different refresh rates, the refresh rate configuration file can be configured according to the model of the electronic device.

Finally, in Step S103, a current refresh rate of the electronic device according to the candidate refresh rate is adjusted.

In some embodiments, the current refresh rate of the electronic device may be set as the candidate refresh rate. According to an example that the above candidate refresh rate is 90 Hz, when the current refresh rate of the electronic device is 120 Hz, the refresh rate with 120 Hz can be replaced by the refresh rate with 90 Hz.

According to the above mode, the current refresh rate of the electronic device is dynamically adjusted, without the need that the current refresh rate of the electronic device is reduced when it is detected that a finger does not touch a screen within a specified duration, so that the power consumption of the electronic device is effectively reduced.

Figure 4:
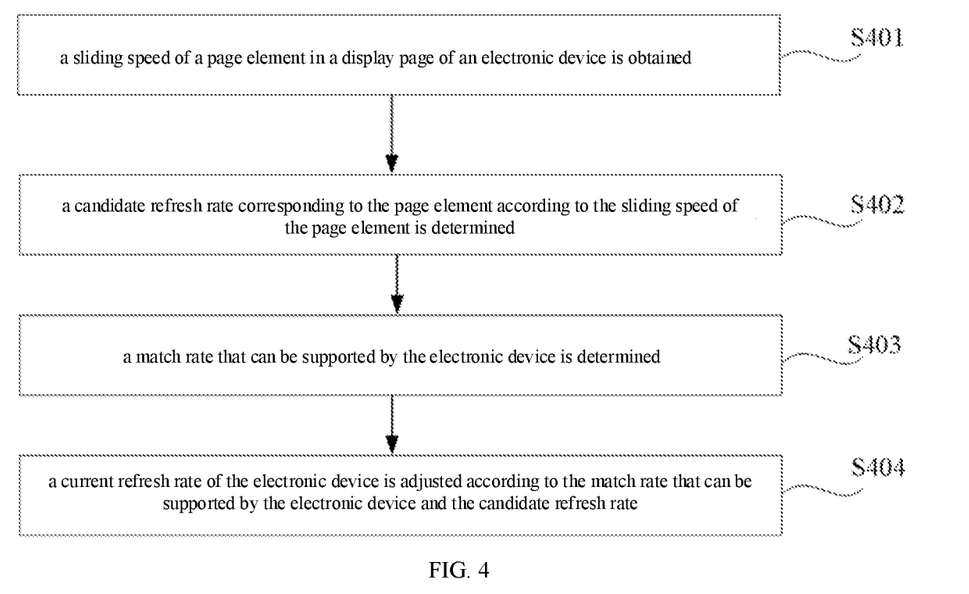
FIG. 4 shows another flow chart of a refresh rate adjusting method according to an example.

FIG. 4 shows another flow chart of a refresh rate adjusting method according to an example. Referring to FIG. 4, the method includes the following steps. In step S401, a sliding speed of a page element in a display page of an electronic device is obtained. Next, in step S402, a candidate refresh rate corresponding to the page element according to the sliding speed of the page element is determined. Then in step S403, a match rate that can be supported by the electronic device is determined. Finally in step S404, a current refresh rate of the electronic device is adjusted according to the match rate that can be supported by the electronic device and the candidate refresh rate.

The above steps S401 and S402 can refer to the implementation processes of the steps S101 and S102 shown in FIG. 1, which is not described in detail in the embodiment.

In the step S403, the match rate that can be supported by the electronic device refers to the maximum refresh rate that the electronic device can support in the current state, the match rate that can be supported by the electronic device can be determined through state information of the electronic device. The state information of the electronic device may include temperature and humidity information and/or electric quantity information to determine the match rate that can be supported by the electronic device.

In the step S404, adjusting the current refresh rate of the electronic device according to the match rate and the candidate refresh rate may adopt the following mode. Adjusting the current refresh rate of the electronic device to be the match rate that can be supported by the electronic device in response to determining that the match rate that can be supported by the electronic device is smaller than or equal to the candidate refresh rate. Adjusting the current refresh rate of the electronic device to be the candidate refresh rate in response to determining that the match rate that can be supported by the electronic device is greater than the candidate refresh rate. That is, under the condition that the match rate supported by the electronic device is smaller than or equal to the candidate refresh rate, the priority of the match rate that can be supported by the electronic device is higher than that of the candidate refresh rate. Under the condition that the match rate that can be supported by the electronic device is greater than the candidate refresh rate, the priority of the match rate that can be supported by the electronic device is lower than that of the candidate refresh rate.

Through the above mode, the match rate that can be supported by the electronic device at present is reasonably considered, and the current refresh rate of the electronic device is adjusted according to the magnitude relationship between the match rate that can be supported by the electronic device and the candidate refresh rate so as to adapt to the state of the electronic device.

Figure 5:
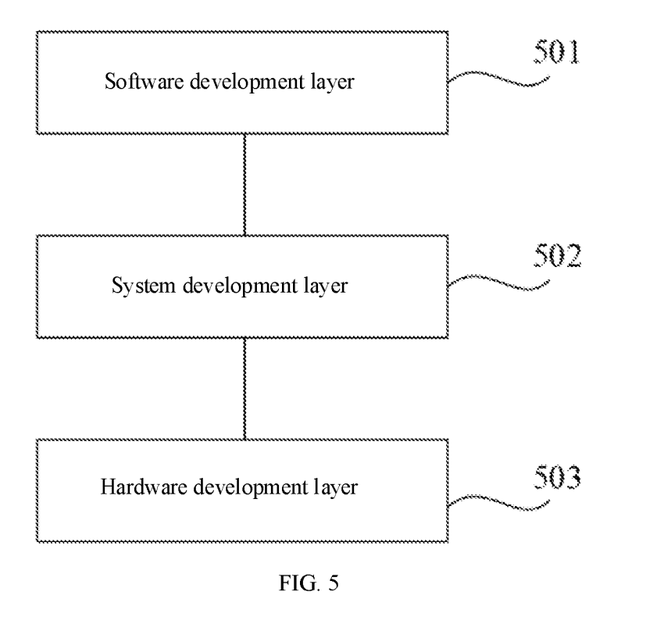
FIG. 5 shows a block diagram of an operating system of an electronic device according to an example.

FIG. 5 shows a schematic structural diagram of an operating system of an electronic device according to an example. Referring to FIG. 5, the operating system of the electronic device includes a software development layer 501, a system development layer 502 and a hardware development layer 503. Each layer preforms corresponding logic, the logic refers to the above each step, and logic results performed by the respective layers can be connected through respective communication interfaces. The embodiment is further explained and illustrated below in combination with FIG. 5.

The software development layer 501 communicates with the system development layer 502 through a first interface, and the system development layer 502 communicates with the hardware development layer 503 through a second interface. The step of obtaining the sliding speed of the page element in the display page of the electronic device is performed through the software development layer 501. The system development layer 502 obtains the sliding speed of the page element through the first interface. Additionally, the step of determining the candidate refresh rate corresponding to the page element according to the sliding speed of the page element is performed through the system development layer 502. The hardware development layer 503 obtains the candidate refresh rate through the second interface, and the step of adjusting the current refresh rate of the electronic device according to the candidate refresh rate is performed through the hardware development layer 503. According to the embodiment of the disclosure, the logic realized in each layer can be independently maintained, and subsequent optimization and upgrade are facilitated.

Taking the independent maintenance of the above software development layer 501 and system development layer 502 as an example for illustration, for the page element being a control in an application, a corresponding library function can be set when the application is developed, and the library function is a function used for achieving an effect of obtaining the sliding speed of the control. That is, when the application is developed, the library function for achieving the effect of obtaining the sliding speed of the control is set, the developed application is configured in the electronic device (it needs to be noted that the application runs in the software development layer 501), and when the application runs the effect of obtaining the sliding speed of the control is achieved at the software development layer 501, and the sliding speed is issued to the system development layer 502 through the first interface. The development of the software development layer 501 does not affect the system development layer 502, and the software development layer 501 and the system development layer 502 are maintained independently.

In some embodiments, the refresh rate adjusting method further includes, adjusting the current refresh rate of the electronic device to be a preset refresh rate that is smaller than the current refresh rate of the electronic device under the condition that the sliding speed of the page element is not successfully obtained and no touch event occurs to the display page within a second preset duration.

It needs to be noted that the first preset duration is smaller than the second preset duration. In the embodiment, no touch event occurs to the display page, which may be characterized as that no finger touches the display page.

By the above mode, in order to avoid the malfunction of the logic for obtaining the sliding speed of the page element, under the condition that the sliding speed of the page element is not successfully obtained and no touch event occurs to the display page within the second preset duration, the current refresh rate of the electronic device is adjusted to be the preset refresh rate, which is a baseline strategy, and the robustness of the whole solution is improved.

Figure 6:
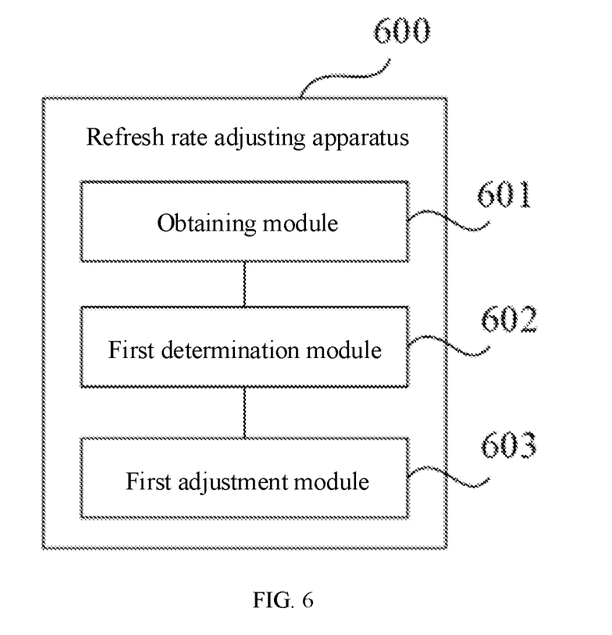
FIG. 6 shows a block diagram of a refresh rate adjusting apparatus according to an example.

FIG. 6 shows a block diagram of a refresh rate adjusting apparatus according to an example. Referring to FIG. 6, the apparatus 600 includes an obtaining module 601, a first determination module 602, and a first adjustment module 603.

The obtaining module 601 is configured to obtain a sliding speed of a page element in a display page of an electronic device. The first determination module 602 is configured to determine a candidate refresh rate corresponding to the page element according to the sliding speed of the page element, the sliding speed being directly proportional to the candidate refresh rate. The first adjustment module 603 is configured to adjust a current refresh rate of the electronic device according to the candidate refresh rate.

In some examples, the first determination module 602 is specifically configured to determine the candidate refresh rate corresponding to the page element according to a preset refresh rate configuration file and the sliding speed of the page element.

In some examples, the obtaining module 601 includes a position change information determination sub-module, configured to determine position change information of the page element of the display page of the electronic device within a first preset duration; and a speed determination sub-module, configured to determine the sliding speed of the page element in the display page of the electronic device according to the position change information of the page element and the first preset duration.

In some examples, the apparatus 600 further includes a second determination module, configured to determine a match rate that can be supported by the electronic device; and the first adjustment module 603 including an adjustment sub-module that is specifically configured to adjust the current refresh rate of the electronic device according to the match rate that can be supported by the electronic device and the candidate refresh rate.

In some examples, the adjustment sub-module includes a first adjustment unit and a second adjustment unit. The first adjustment unit is configured to adjust the current refresh rate of the electronic device to be the match rate that can be supported by the electronic device in response to determining that the match rate that can be supported by the electronic device is smaller than or equal to the candidate refresh rate. The second adjustment unit is configured to adjust the current refresh rate of the electronic device to be the candidate refresh rate in response to determining that the match rate that can be supported by the electronic device is greater than the candidate refresh rate.

In some examples, an operating system of the electronic device includes a software development layer, a system development layer and a hardware development layer, the software development layer communicates with the system development layer through a first interface, and the system development layer communicates with the hardware development layer through a second interface. The obtaining module 601 is configured to perform the step of obtaining the sliding speed of the page element in the display page of the electronic device through the software development layer. The first determination module 602 is configured to perform the step of determining the candidate refresh rate corresponding to the page element according to the sliding speed of the page element through the system development layer that obtains the sliding speed of the page element through the first interface. The first adjustment module 603 is configured to perform the step of adjusting the current refresh rate of the electronic device according to the candidate refresh rate through the hardware development layer that obtains the candidate refresh rate through the second interface.

In some examples, the apparatus 600 further includes a second adjustment module, configured to adjust the current refresh rate of the electronic device to be a preset refresh rate that is smaller than the current refresh rate of the electronic device under the condition that the sliding speed of the page element is not successfully obtained and no touch event occurs to the display page within a second preset duration.

According to the apparatus in the above embodiment, the specific mode of performing operations by each module is described in detail in the embodiments of the method, which is not described in detail here.

The disclosure further provides a computer readable storage medium, storing computer program instructions that perform the steps of the refresh rate adjusting method provided by the disclosure when being executed by a processor.

Figure 7:
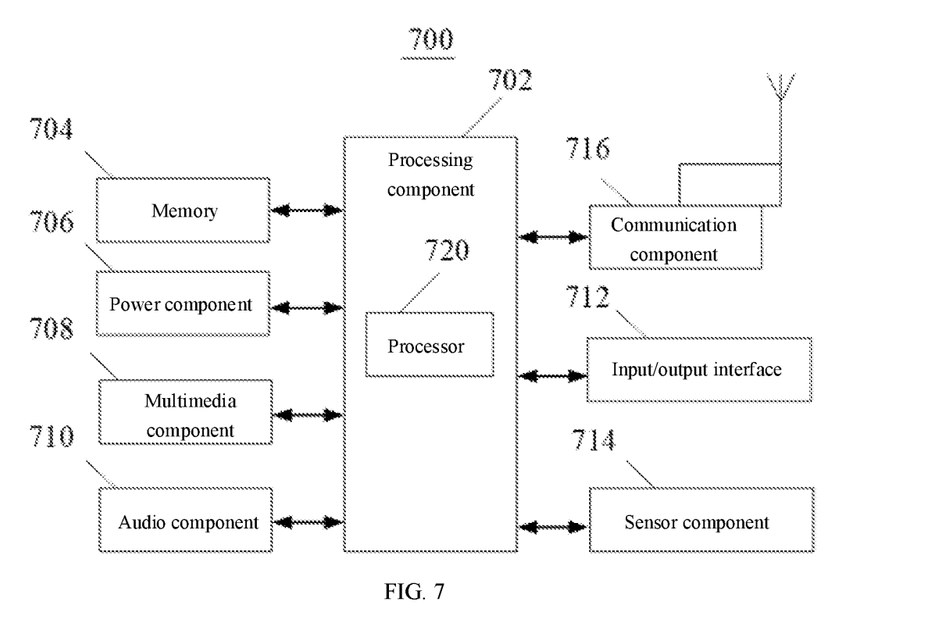
FIG. 7 shows a block diagram of an electronic device according to an example.

FIG. 7 shows a block diagram of an electronic device 700 according to an example. For example, the electronic device 700 may be a mobile phone, a computer, a digital broadcast terminal, a message transceiver, a game console, a tablet device, a medical device, a fitness device, a personal digital assistant, or the like.

Referring to FIG. 7, the electronic device 700 may include one or more of the following components: a processing component 702, a memory 704, a power component 706, a multimedia component 708, an audio component 710, an input/output (I/O) interface 712, a sensor component 714, and a communication component 716.

The processing component 702 generally controls overall operations of the electronic device 700, such as operations associated with display, telephone call, data communication, camera operation, and recording operation. The processing component 702 may include one or more processors 720 to execute the instructions to complete all or part of the above steps of the refresh rate adjusting method. In addition, the processing component 702 may include one or more modules, facilitating interaction between the processing component 702 and other components. For example, the processing component 702 may include a multimedia module to facilitate interaction between the multimedia component 708 and the processing component 702.

The memory 704 is configured to store various types of data to support the operation of the electronic device 700. Examples of these data include instructions, contact data, telephone directory data, messages, pictures, videos, etc., for any application or method operating on the electronic device 700. The memory 704 may be implemented by any type of volatile or non-volatile storage device, or a combination of the volatile and non-volatile storage devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 706 provides power to the various components of the electronic device 700. The power component 706 may include a power management system, one or more power sources, and other components associated with generation, management, and distribution of power for the electronic device 700.

The multimedia component 708 includes a screen providing an output interface between the electronic device 700 and a user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, slides, and gestures on the touch panel. The touch sensor may not only sense boundaries of a touch or slide action, but also detect duration and pressure associated with the touch or slide action. In some embodiments, the multimedia component 708 includes a front camera and/or a rear camera. When the electronic device 700 is in an operation mode, such as a shooting mode or a video mode, the front camera and/or the rear camera can receive external multimedia data. Each front camera and each rear camera may be a fixed optical lens system or have a focal length and optical zoom capability.

The audio component 710 is configured to output and/or input an audio signal. For example, the audio component 710 includes a microphone (MIC) configured to receive an external audio signal when the electronic device 700 is in an operation mode, such as a call mode, a recording mode, and a voice recognition mode. The received audio signal may be further stored in the memory 704 or transmitted via the communication component 716. In some embodiments, the audio component 710 further includes a speaker for outputting an audio signal.

The I/O interface 712 provides an interface between the processing component 702 and a peripheral interface module, and the above peripheral interface module may be a keyboard, a click wheel, a button and the like. These buttons may include, but are not limited to a homepage button, a volume button, a start button, and a lock button.

The sensor component 714 includes one or more sensors for providing state evaluations in various aspects of the electronic device 700. For example, the sensor component 714 may detect an on/off state of the electronic device 700, and relative positioning of the component, for example, the component is a display and a keypad of the electronic device 700. The sensor component 714 may also detect a position change of the electronic device 700 or one component of the electronic device 700, the presence or absence of the contact between the user and the electronic device 700, the orientation or acceleration/deceleration of the electronic device 700, and a temperature change of the electronic device 700. The sensor component 714 may include a proximity sensor configured to detect the presence of a nearby object without any physical contact. The sensor component 714 may also include a light sensor, such as a CMOS or CCD image sensor, for use in imaging application. In some embodiments, the sensor component 714 may also include an acceleration sensor, a gyroscope sensor, a magnetic sensor, a pressure sensor, or a temperature sensor.

The communication component 716 is configured to facilitate wired or wireless communication between the electronic device 700 and other devices. The electronic device 700 may access a wireless network based on a communication standard, such as WiFi, 2G or 3G, or a combination. In an example, the communication component 716 receives broadcast signals or broadcast related information from an external broadcast management system via a broadcast channel. In an example, the communication component 716 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the electronic device 700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components for performing the above refresh rate adjusting method.

In an example, the further provided is a non-transitory computer readable storage medium, such as a memory 704 including instructions executable by a processor 720 of the electronic device 700 to complete the above refresh rate adjusting method. For example, the non-transitory computer readable storage medium may be a ROM, a random access memory (RAM), a CD-ROM, a tape, a floppy disk, an optical data storage device, or the like.

Those skilled in the art may readily conceive other embodiments of the disclosure after taking into account the description and practicing the disclosure. The disclosure aims to cover any variations, uses or adaptive variations of the disclosure, these variations, uses or adaptive variations follow the general principles of the disclosure and include the known common knowledge or customary technical means in the art, which is not disclosed by the disclosure. The description and embodiments are considered merely exemplary, and the true scope and spirit of the disclosure are indicated by the following claims.

It should be understood that the disclosure is not limited to the precise structures that have been described above and shown in the figures, and that various modifications and changes can be made without departing from the scope. The scope of the disclosure is limited merely by the attached claims.

What is claimed is:

1. A refresh rate adjusting method, comprising:
    obtaining a sliding speed of a page element in a display page of an electronic device;
    determining a candidate refresh rate corresponding to the page element according to the sliding speed of the page element, the sliding speed being directly proportional to the candidate refresh rate; and
    adjusting a current refresh rate of the electronic device according to the candidate refresh rate;
    wherein an operating system of the electronic device comprises a software development layer, a system development layer and a hardware development layer, the software development layer communicates with the system development layer through a first interface, and the system development layer communicates with the hardware development layer through a second interface;
    the obtaining the sliding speed of the page element in the display page of the electronic device is performed through the software development layer;
    the determining the candidate refresh rate corresponding to the page element according to the sliding speed of the page element is performed through the system development layer that obtains the sliding speed of the page element through the first interface; and
    the adjusting the current refresh rate of the electronic device according to the candidate refresh rate is performed through the hardware development layer that obtains the candidate refresh rate through the second interface.

2. The refresh rate adjusting method according to claim 1, wherein determining the candidate refresh rate corresponding to the page element according to the sliding speed of the page element comprises:
    determining the candidate refresh rate corresponding to the page element according to a preset refresh rate configuration file and the sliding speed of the page element.

3. The refresh rate adjusting method according to claim 1, wherein obtaining the sliding speed of the page element in the display page of the electronic device comprises:
    determining position change information of the page element in the display page of the electronic device within a first preset duration; and determining the sliding speed of the page element in the display page of the electronic device according to the position change information of the page element and the first preset duration.

4. The refresh rate adjusting method according to claim 1, further comprising:
determining a match rate that can be supported by the electronic device; and
adjusting the current refresh rate of the electronic device according to the candidate refresh rate comprising:
adjusting the current refresh rate of the electronic device according to the match rate that can be supported by the electronic device and the candidate refresh rate.

5. The refresh rate adjusting method according to claim 4, wherein adjusting the current refresh rate of the electronic device according to the match rate that can be supported by the electronic device and the candidate refresh rate comprises:
adjusting the current refresh rate of the electronic device to be the match rate that can be supported by the electronic device in response to determining that the match rate that can be supported by the electronic device is smaller than or equal to the candidate refresh rate; and
adjusting the current refresh rate of the electronic device to be the candidate refresh rate in response to determining that the match rate that can be supported by the electronic device is greater than the candidate refresh rate.

6. The refresh rate adjusting method according to claim 1, further comprising:
adjusting the current refresh rate of the electronic device to be a preset refresh rate that is smaller than the current refresh rate of the electronic device under the condition that the sliding speed of the page element is not successfully obtained and no touch event occurs to the display page within a second preset duration.

7. An electronic device, comprising:
a memory, storing a computer program;
a processor configured to execute the computer program in the memory to:
obtain a sliding speed of a page element in a display page of an electronic device;
determine a candidate refresh rate corresponding to the page element according to the sliding speed of the page element, the sliding speed being directly proportional to the candidate refresh rate; and
adjust a current refresh rate of the electronic device according to the candidate refresh rate;
wherein an operating system of the electronic device comprises a software development layer, a system development layer and a hardware development layer, the software development layer communicates with the system development layer through a first interface, and the system development layer communicates with the hardware development layer through a second interface; and
the processor further configured to execute the computer program in the memory to:
perform the obtaining the sliding speed of the page element in the display page of the electronic device through the software development layer;
perform the determining the candidate refresh rate corresponding to the page element according to the sliding speed of the page element through the system development layer that obtains the sliding speed of the page element through the first interface; and
perform the adjusting the current refresh rate of the electronic device according to the candidate refresh rate through the hardware development layer that obtains the candidate refresh rate through the second interface.

8. The electronic device according to claim 7, wherein the processor is further configured to execute the computer program in the memory to:
determine the candidate refresh rate corresponding to the page element according to a preset refresh rate configuration file and the sliding speed of the page element.

9. The electronic device according to claim 7, wherein the processor is further configured to execute the computer program in the memory to:
determine position change information of the page element in the display page of the electronic device within a first preset duration; and
determine the sliding speed of the page element in the display page of the electronic device according to the position change information of the page element and the first preset duration.

10. The electronic device according to claim 7, wherein the processor is further configured to execute the computer program in the memory to:
determine a match rate that can be supported by the electronic device; and
adjust the current refresh rate of the electronic device according to the match rate that can be supported by the electronic device and the candidate refresh rate.

11. The electronic device according to claim 10, wherein the processor is further configured to execute the computer program in the memory to:
adjust the current refresh rate of the electronic device to be the match rate supported by the electronic device in response to determining that the match rate supported by the electronic device is smaller than or equal to the candidate refresh rate; and
adjust the current refresh rate of the electronic device to be the candidate refresh rate in response to determining that the match rate supported by the electronic device is greater than the candidate refresh rate.

12. The electronic device according to claim 7, wherein the processor is further configured to execute the computer program in the memory to:
adjust the current refresh rate of the electronic device to be a preset refresh rate that is smaller than the current refresh rate of the electronic device under the condition that the sliding speed of the page element is not successfully obtained and no touch event occurs to the display page within a second preset duration.

13. A non-transitory computer readable storage medium, storing computer program instructions, wherein when the program instructions are executed by a processor to:
obtain a sliding speed of a page element in a display page of an electronic device;
determine a candidate refresh rate corresponding to the page element according to the sliding speed of the page element, the sliding speed being directly proportional to the candidate refresh rate; and
adjust a current refresh rate of the electronic device according to the candidate refresh rate;
wherein an operating system of the electronic device comprises a software development layer, a system development layer and a hardware development layer, the software development layer communicates with the system development layer through a first interface, and the system development layer communicates with the hardware development layer through a second interface; when the program instructions are executed by the processor to:
perform the obtaining the sliding speed of the page element in the display page of the electronic device through the software development layer;
perform the determining the candidate refresh rate corresponding to the page element according to the sliding speed of the page element through the system development layer that obtains the sliding speed of the page element through the first interface; and
perform the adjusting the current refresh rate of the electronic device according to the candidate refresh rate through the hardware development layer that obtains the candidate refresh rate through the second interface.

14. The non-transitory computer readable storage medium according to claim 13, storing computer program instructions, wherein when the program instructions are executed by the processor to:
determine the candidate refresh rate corresponding to the page element according to a preset refresh rate configuration file and the sliding speed of the page element.

15. The non-transitory computer readable storage medium according to claim 13, storing computer program instructions, wherein when the program instructions are executed by the processor to:
determine position change information of the page element in the display page of the electronic device within a first preset duration; and
determine the sliding speed of the page element in the display page of the electronic device according to the position change information of the page element and the first preset duration.

16. The non-transitory computer readable storage medium according to claim 13, storing computer program instructions, wherein when the program instructions are executed by the processor to:
determine a match rate that can be supported by the electronic device; and
adjust the current refresh rate of the electronic device according to the match rate that can be supported by the electronic device and the candidate refresh rate.

17. The non-transitory computer readable storage medium according to claim 16, storing computer program instructions, wherein when the program instructions are executed by the processor to:
adjust the current refresh rate of the electronic device to be the match rate that can be supported by the electronic device in response to determining that the match rate that can be supported by the electronic device is smaller than or equal to the candidate refresh rate; and
adjust the current refresh rate of the electronic device to be the candidate refresh rate in response to determining that the match rate that can be supported by the electronic device is greater than the candidate refresh rate.

* * * * *